(12) United States Patent
Wong

(10) Patent No.: US 12,554,979 B2
(45) Date of Patent: Feb. 17, 2026

(54) ADAPTING AI MODELS FROM ONE DOMAIN TO ANOTHER

(71) Applicant: ServiceNow, Inc., Santa Clara, CA (US)

(72) Inventor: Daniel Wong, Montreal (CA)

(73) Assignee: ServiceNow, Inc., Santa Clara, CA (US)

( * ) Notice: Subject to any disclaimer, the term of this patent is extended or adjusted under 35 U.S.C. 154(b) by 1126 days.

(21) Appl. No.: 17/085,603

(22) Filed: Oct. 30, 2020

(65) Prior Publication Data

US 2022/0138552 A1    May 5, 2022

(51) Int. Cl.
| | |
|---|---|
| G06N 3/08 | (2023.01) |
| G06N 3/04 | (2023.01) |
| G06N 3/0464 | (2023.01) |
| G06N 3/0499 | (2023.01) |
| G06N 3/09 | (2023.01) |
| G06N 3/096 | (2023.01) |

(52) U.S. Cl.
CPC ............ *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS 11,636,348 B1 *   4/2023  Tang .................... G06N 7/01
                                                     706/16
2019/0114544 A1    4/2019  Sundaram et al.
2020/0183048 A1    6/2020  Xu et al.
2020/0234079 A1 *  7/2020  Minhas ................. G06N 3/08
2020/0372326 A1 * 11/2020  Oreshkin ............. G06N 3/044

FOREIGN PATENT DOCUMENTS

WO        2019/193462 A1    10/2019

OTHER PUBLICATIONS

Mancini M, Bulo SR, Caputo B, Ricci E. Best sources forward: domain generalization through source-specific nets. In2018 25th IEEE international conference on image processing (ICIP) Oct. 7, 2018 (pp. 1353-1357). IEEE. (Year: 2018).*

(Continued)

*Primary Examiner* — Kamran Afshar
*Assistant Examiner* — Steven Phung
(74) *Attorney, Agent, or Firm* — FLETCHER YODER PC

(57) ABSTRACT

A method for adapting to a new domain an AI model pre-trained for a current domain. Having at least one main block of the AI model for modeling a target variable and having at least one covariates block of the AI model for modeling covariates effect on the target variable in the current domain, the method comprises: replacing the covariates block with a new covariates block adapted to the new domain, the new covariates block modifying one or more first layers compared to the covariate block, the target variable in the new domain being affected differently by at least one of the one or more covariates; training the new covariates block of the AI model using a new-domain-specific dataset from the new domain; and fine-tuning the at least one main block of the AI model using the new-domain-specific dataset from the new domain.

22 Claims, 9 Drawing Sheets

(56) References Cited

OTHER PUBLICATIONS

Oreshkin BN, Carpov D, Chapados N, Bengio Y. N-Beats: Neural basis expansion analysis for interpretable time series forecasting. arXiv preprint arXiv:1905.10437. May 24, 2019. (Year: 2019).*
Cohen T, Shulman N, Morgenstern H, Mechrez R, Farhan E. Self-supervised dynamic networks for covariate shift robustness. arXiv preprint arXiv:2006.03952. Jun. 6, 2020. (Year: 2020).*
Lee SW, Kim JH, Jun J, Ha JW, Zhang BT. Overcoming catastrophic forgetting by incremental moment matching. Advances in neural information processing systems. 2017. (Year: 2017).*
International preliminary report on patentability dated May 2, 2023 from corresponding PCT/CA2021/051532.
Office action dated Mar. 9, 2023 from corresponding CA application No. 3,097,651.

* cited by examiner

ADAPTING AI MODELS FROM ONE DOMAIN TO ANOTHER

TECHNICAL FIELD

The present invention relates to computer technology and machine learning and, more particularly to a system and a method for adapting to a new domain an AI model pre-trained for forecasting time series using a plurality of neural network based execution blocks in a current domain.

BACKGROUND

Forecasting future values of a target variable using its past values is an important application of machine learning algorithms. Over the last few decades, different methods have been developed to answer the need for forecasting.

One issue with current solutions is the large number of neural network parameters, which can cause, for instance, the model to underfit the training data, particularly when the training dataset's size is limited.

Therefore, there is a need to develop and improve forecasting future values of a target variable in the context of artificial intelligence.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for adapting to a new domain an AI model pre-trained for a current domain. The AI model comprises at least one main block for modeling a target variable and at least one covariates block for modeling covariates effect on the target variable in the current domain, the AI model being pre-trained to forecast future values of the target variable using past values thereof in the current domain, the values of the target variable being affected by one or more covariates wherein the covariates are independent from the target variable. In order to adapt the AI model to the new domain, the method comprises: replacing the covariates block with a new covariates block adapted to the new domain, the new covariates block modifying one or more first layers compared to the covariate block, the target variable in the new domain being affected differently by at least one of the one or more covariates; training the new covariates block of the AI model using a new-domain-specific dataset from the new domain; and fine-tuning the at least one main block of the AI model using the new-domain-specific dataset from the new domain. Other embodiments of this aspect include corresponding computer systems, apparatus, and computer programs recorded on one or more computer storage devices, each configured to perform the actions of the methods.

Implementations may include one or more of the following features. The main block of the AI model may model a target variable by producing a forecast of future values of the target variable.

Optionally, the target variable in the new domain may be affected by at least one covariate different from the covariates affecting the target variable in the current domain.

Optionally, the new covariates block may be chosen to structurally accommodate the covariates of the new domain.

Optionally, training the new covariates block of the AI model using a new-domain-specific dataset may be performed by: freezing the at least one main block; and training the AI model using the new-domain-specific dataset.

Optionally, freezing the at least one main block may be performed to prevent the at least one main block from fitting the new-domain-specific dataset.

Optionally, the method may include before fine-tuning the at least one main block of the AI model using the new-domain-specific dataset: freezing the covariates block; and unfreezing the at least one main block.

Optionally, the main block may be a neural network based model for univariate time series forecasting (N-BEATS).

Optionally, fine-tuning the at least one main block of the AI model on data from the new domain may be performed using incremental moment matching algorithms.

Optionally, fine-tuning the at least one main block of the AI model on data from the new domain may be performed using transfer learning based fine-tuning.

Implementations of the described techniques may include hardware, a method or process, or computer software on a computer-accessible medium.

One general aspect includes an artificial intelligence server configured for adapting to a new domain an AI model pre-trained for a current domain. The AI model comprises at least one main block for modeling a target variable and at least one covariates block for modeling covariates effect on the target variable in the current domain. The AI model being pre-trained to forecast future values of the target variable using past values thereof in the current domain. The values of the target variable being affected by one or more covariates wherein the covariates are independent from the target variable. In order to adapt the AI model to the new domain, the artificial intelligence server comprises: a memory module for storing a new-domain-specific dataset and a current-domain-specific dataset; and processor module configured to replace the covariates block with a new covariates block adapted to the new domain, the new covariates block modifying one or more first layers compared to the covariate block, the target variable in the new domain being affected differently by at least one of the one or more covariates; train the new covariates block of the AI model using a new-domain-specific dataset from the new domain; and fine-tune the at least one main block of the AI model using the new-domain-specific dataset from the new domain. Other embodiments of this aspect include corresponding computer systems, apparatus, and computer programs recorded on one or more computer storage devices, each configured to perform the actions of the methods.

Optionally, the main block of the AI model may model a target variable by producing a forecast of future values of the target variable.

Optionally, the target variable in the new domain may be affected by at least one covariate different from the covariates affecting the target variable in the current domain.

Optionally, the new covariates block may be chosen to structurally accommodate the covariates of the new domain.

Optionally, training the new covariates block of the AI model using a new-domain-specific dataset may be performed by: freezing the at least one main block; and training the AI model using the new-domain-specific dataset.

Optionally, freezing the at least one main block may be performed to prevent the at least one main block from fitting the new-domain-specific dataset.

Optionally, the processor module may be configured to before fine-tuning the at least one main block of the AI model using the new-domain-specific dataset: freeze the covariates block; and unfreeze the at least one main block.

Optionally, main block may be a neural network based model for univariate time series forecasting (N-BEATS).

Optionally, fine-tuning the at least one main block of the AI model on data from the new domain may be performed using incremental moment matching algorithms.

Optionally, fine-tuning the at least one main block of the AI model on data from the new domain may be performed using transfer learning based fine-tuning.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1:
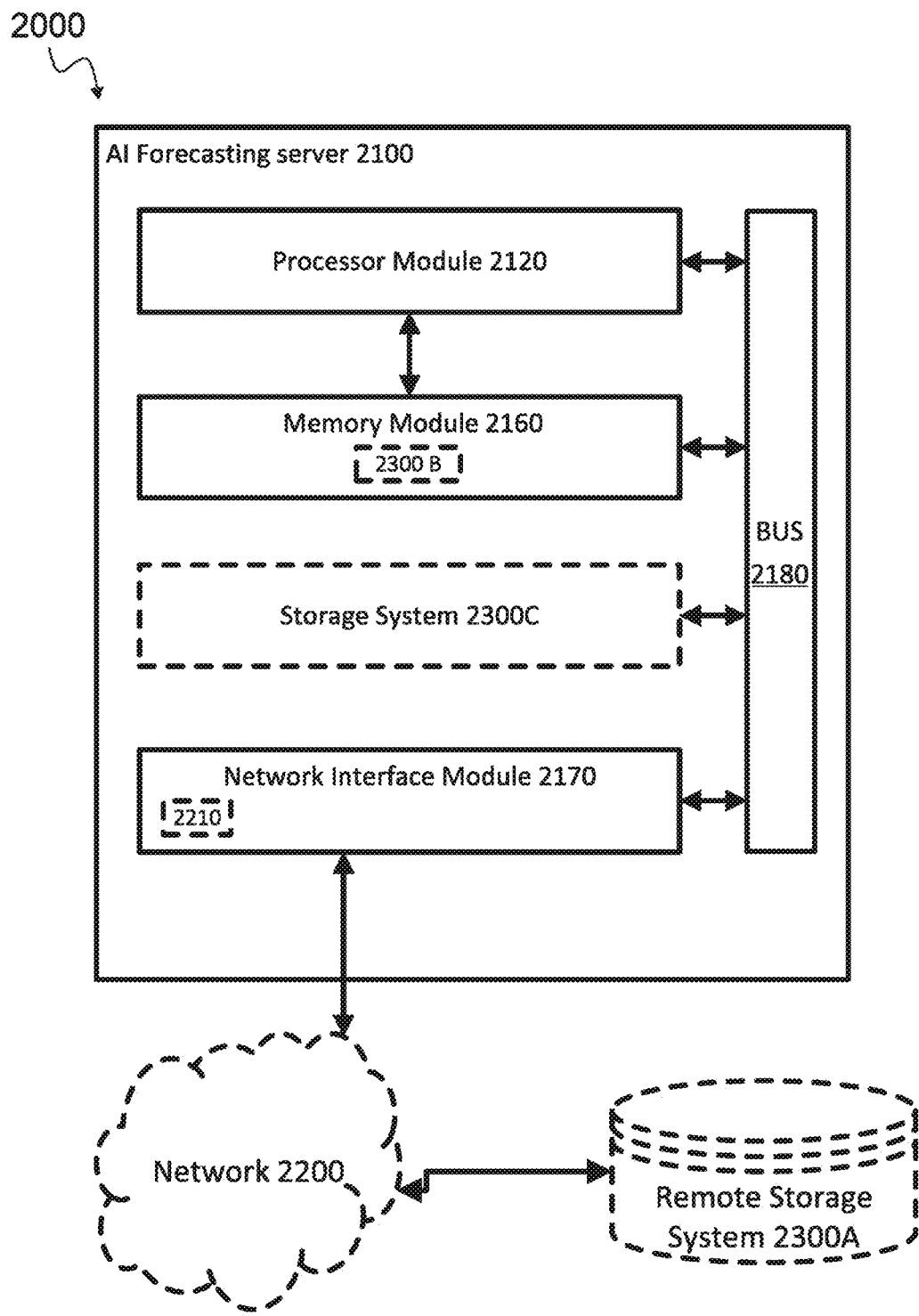
FIG. 1 is a logical modular representation of an exemplary artificial intelligence server in accordance with the teachings of the present invention.

The developed methods rarely included covariates influencing the target variable even though the result of the forecast can be greatly improved by the taking the covariates into account. The rare methods that have been developed to produce a forecast taking into account the covariates constraint the temporal relationship between the covariates and the target variable.

Forecasting a target variable based on its past values using machine learning algorithms requires large amounts of data. More importantly, the produced forecasts are not always satisfactory and are not as good as the forecasts generated using established methods such as probabilistic and statistical methods. As the real world problems tend to depend on a plurality of covariates, combining time series forecasting with the covariates is a way to improve the performance of AI models specialized in forecasting.

A first set of embodiments of the present invention relates to combining time series forecasting with the covariates to obtain an architecture of deep-learning models that produces improved forecasts. This is achieved by combining a covariate-specific AI model that performs well for forecasting tasks with a covariate-specific AI model that performs well for defining the covariates effect on the target variable. One goal is to be able to model the covariate effect on the target variable and to remove it before forecasting the target variable. In some embodiments, one or more covariate-specific AI models can be combined with a plurality of covariate-specific AI models to produce the forecast.

A second set of embodiments of the present invention relates to combining time series forecasting with temporal as well as categorical covariates to produce an improved forecast. This is achieved by combining a temporal-covariate-specific AI model that forecasts the temporal covariates in the horizon with a covariate-specific AI model that performs well for forecasting tasks and a covariate-specific AI model that performs well for defining the covariates effect on the target variable. The time period during which the target variable is to be forecast is known as the horizon. Once the temporal and the categorical covariate's effect are defined, they are removed from the target variable before forecasting. In some embodiments, one or more covariate-specific AI models can be combined with a plurality of covariate-specific AI models and a plurality of temporal-covariate-specific AI models to produce the forecast.

A third set of embodiments of the present invention relates to adapting to a new domain an AI model pre-trained for a current domain. In this set of embodiments, the AI model has at least one main block for modeling a target variable and at least one covariates block for modeling covariates effect on the target variable in the current domain. Adapting the AI model to a new domain is performed by replacing the covariates block with at least one new covariates block adapted to the new domain, training the new covariates block on a new-domain-specific dataset, and fine-tuning the main block of the AI model using the new-domain-specific dataset from the new domain. In some embodiments, the AI model may have more than one covariates block and/or main block and repetition can be made for more than one block of the AI model.

In accordance with the first set of embodiments, a forecast of future values of a target variable using past values of the target variable is produced by combining a covariate-specific AI model with a target-variable-specific AI model. The covariate-specific AI model computes the covariate effect on the target variable and the target-variable-specific AI model generates the forecast of future values of the target variable. The covariate effect on the target variable is removed before forecasting its future values.

FIG. 1 shows a logical modular representation of an exemplary system 2000 of an Artificial Intelligence (AI) forecasting server 2100. The AI forecasting server 2100 comprises a memory module 2160, a processor module 2120 and may comprise a network interface module 2170. In certain embodiments, the processor module 2120 may comprise a data manager 2122 and/or a plurality of processing nodes 2124. The system 2000 may also include a storage system 2300. The system 2000 may include a network 2200 for accessing the storage system 2300 or other nodes (not shown).

The storage system 2300 may be used for storing and accessing long-term or non-transitory data and may further log data while the system 2000 is being used. FIG. 1 shows examples of the storage system 2300 as a distinct database system 2300A, a distinct module 2300C of the AI forecasting server 2100 or a sub-module 2300B of the memory module 2160 of the AI forecasting server 2100. The storage system 2300 may be distributed over different systems A, B, C. The storage system 2300 may comprise one or more logical or physical as well as local or remote hard disk drive (HDD) (or an array thereof). The storage system 2300 may further comprise a local or remote database made accessible to the AI forecasting server 2100 by a standardized or proprietary interface or via the network interface module 2170. The variants of the storage system 2300 usable in the context of the present invention will be readily apparent to persons skilled in the art. In the depicted example of FIG. 1, the AI forecasting server 2100 shows an optional remote storage system 2300A which may communicate through the network 2200 with the AI server 2100. The storage module 2300 may be accessible to all modules of the AI server 2100 via the network interface module 2170 through the network 2200 (e.g., a networked data storage system). The network interface module 2170 represents at least one physical interface 2210 that can be used to communicate with other network nodes. The network interface module 2170 may be made visible to the other modules of the network node 2200 through one or more logical interfaces. The actual stacks of protocols used by the physical network interface(s) and/or logical network interface(s) of the network interface module 2170 do not affect the teachings of the present invention. The variants of processor module 2120, memory module 2160, network interface module 2170 and storage system 2300 usable in the context of the present invention will be readily apparent to persons skilled in the art. Likewise, even though explicit mentions of the memory module 2160 and/or the processor module 2120 are not made throughout the description of the present examples, persons skilled in the art will readily recognize that such modules are used in conjunction with other modules of AI forecasting server 2100 to perform routine as well as innovative steps related to the present invention.

The processor module 2120 may represent a single processor with one or more processor cores or an array of processors, each comprising one or more processor cores. The memory module 2160 may comprise various types of memory (different standardized or kinds of Random Access Memory (RAM) modules, memory cards, Read-Only Memory (ROM) modules, programmable ROM, etc.).

A bus 2180 is depicted as an example of means for exchanging data between the different modules of the AI forecasting server 2100. The present invention is not affected by the way the different modules exchange information. For instance, the memory module 2160 and the processor module 2120 could be connected by a parallel bus, but could also be connected by a serial connection or involve an intermediate module (not shown) without affecting the teachings of the present invention.

Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

Figure 2:
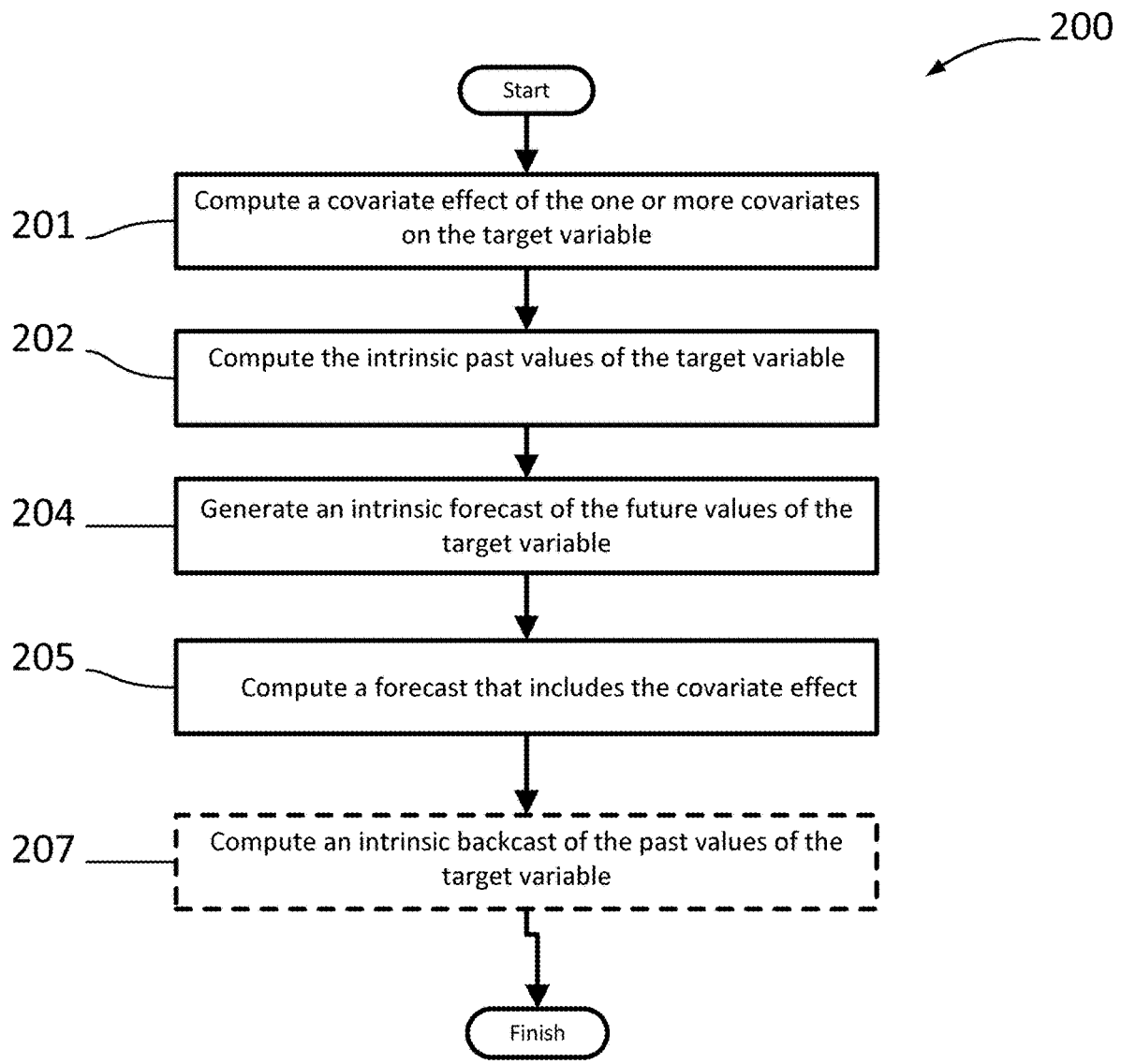
FIG. 2 is an exemplary method for forecasting a target variable in accordance with the teachings of a first set of embodiments of the present invention.

Reference is now made to the drawings in which FIG. 2 shows a flow chart of an exemplary method 200 for forecasting future values of a target variable using past values thereof. In the method 200 the values of the target variable are affected by one or more covariates. The covariates are independent from the target variable.

The past and future values of the target variable are known as the time series of the target variable. The target variable is the variable whose future values are to be forecast based on its past values. For instance, the target variable may represent sales of a particular store or a particular product. In such an example, the past values of the target variable may be the sales of this particular store or product during a certain period of time. The sales may be recorded hourly, on a daily, weekly, or monthly basis, etc. The sales of the particular store or product in the time represent the time series of the target variable.

Conceptually, forecasting involves the prediction of the future unknown values of the dependent variables based on known values of the independent variable. In our case, forecasting involves the prediction of the future values of the target variable based on past values thereof. Accordingly, dependent variables are the output of the process (i.e., future values of the target variable). Independent variables are the input of the process (i.e., past values of the target variable, and past and future values of the covariates).

Similarly, backcasting involves predicting the latent additive components of the independent variable (i.e., past values of the target variable) that explain the predicted additive component of the dependent variable (future values of the target variable).

The time period during which the target variable is recorded and used to forecast future values of the target variable is known as lookback period. The time period during which the target variable is to be forecast is known as the horizon.

The target variable can be seen as a variable that depends on a plurality of variables. The covariates refer to covariate time series that influence the target variable but are independent therefrom. One way to conceptualize this dependency is by imagining that the process generating the covariate time series affects the process generating the target variable but not vice versa. An example of this unilateral dependency is that the weather influences the health of a human being but the health of the human being does not influence the weather.

In general, the target variable and the covariates may be closely related. In the example where the target variable were sales for a particular store or product, the covariates may include one or more of: the price, the day of week, the day of month, state where the store is located, special events, etc. An example of a special event may be super Tuesday.

The method 200 comprises, using a covariate-specific AI model, computing 201 a covariates effect of the one or more covariates on the target variable. The covariates affect the target variable. The covariates effect is a defined modification to the values of the target variable caused by the one or more covariates. Generally, the covariate effect refers to the measurable modification that the values of the target variable undergo due to the covariates. For example, one covariate may multiply certain components of the target variable by some coefficient. Thus, in this example, the covariate effect is the multiplication of certain components of the target variable by this same coefficient. Another covariate effect may be the addition of some value to the target variable, etc.

The covariate effect may be obtained using a fully connected layer. Alternatively, the covariate effect may be obtained using a convolution block (or convolutional layers). A person skilled in the art would already recognize that there are a plurality of methods by which the covariates effect may be obtained.

The covariate-specific AI model is an AI model that has been pre-trained to model the covariates effect on the target variable. Generally, the covariates vary depending on the target variable. Therefore, the covariate-specific AI model may perform better if it is trained on a dataset that is from the same domain as the target variable.

The method 200 also comprises computing 202 intrinsic past values of the target variable by removing the covariate effect of the one or more covariates from past values of the target variable. Removing the covariate effect refers to eliminating the covariates effect from past values of the target variable. By way of illustration, the target variable may be modified as a function of the covariate effect. Removing the covariate effect can be achieved by performing the inverse function. In the example where the one or more covariates multiply certain components of the target variable by some coefficient, removing the covariate effect is performed by dividing these components of the target variable by that same coefficient. In the example where the one or more covariates add some value to the target variable, removing the covariate effect is performed by subtracting this same value from the target variable.

For the sake of clarity, the examples of covariates effects discussed until here are multiplication and addition. More complicated covariates effects may be treated by the present invention. This can be achieved by defining a function that models the covariates effects.

The method 200 comprises generating 204 an intrinsic forecast of the future values of the target variable using a target-variable-specific AI model. The target-variable-specific AI model is an AI model that has been pre-trained to output forecasts and, optionally, backcasts of a target variable when the input is past values of said target variable. For example, some target-variable-specific AI model may be trained to find the seasonal patterns in the target variable. This target-variable-specific AI model may use the seasonal pattern to predict and generate the intrinsic forecast of future values of the target variable. The target-variable-specific AI model may be a neural network based model for univariate time series forecasting (N-BEATS).

The method 200 further comprises computing 205 a forecast that includes the covariate effect using the intrinsic forecast of the future values of the target variable and the covariate effect of the one or more covariates. This is achieved by applying the covariate effect to the forecast of the future values of the target variable. In the example where the covariates multiply certain components of the target variable by some coefficient, including the covariate effect is performed by multiplying the corresponding components of the intrinsic forecast by that same coefficient. In the example where the covariate adds some value to the target variable, including the covariate effect is performed by adding this same value to the intrinsic forecast of the target variable.

Optionally, the method 200 comprises generating 207 an intrinsic backcast of the past values of the target variable using a target-variable-specific AI model. The backcast represents past values of the target variable obtained using the intrinsic forecast future values of the target variable. The target-variable-specific AI model is an AI model that has been pre-trained to output forecasts and backcasts of a target variable when the input is past values of said target variable.

Optionally, the target-variable-specific AI model and the covariate-specific AI model may be combined in a single AI model.

The method 200 may be used in other architectures where a plurality of target-variable-specific AI models and covariate-specific AI models may be used concurrently or subsequently to forecast the future values of the target variable. The flow chart of the FIG. 3 shows how the method 200 can be generalized with regards to this aspect.

Figure 3:
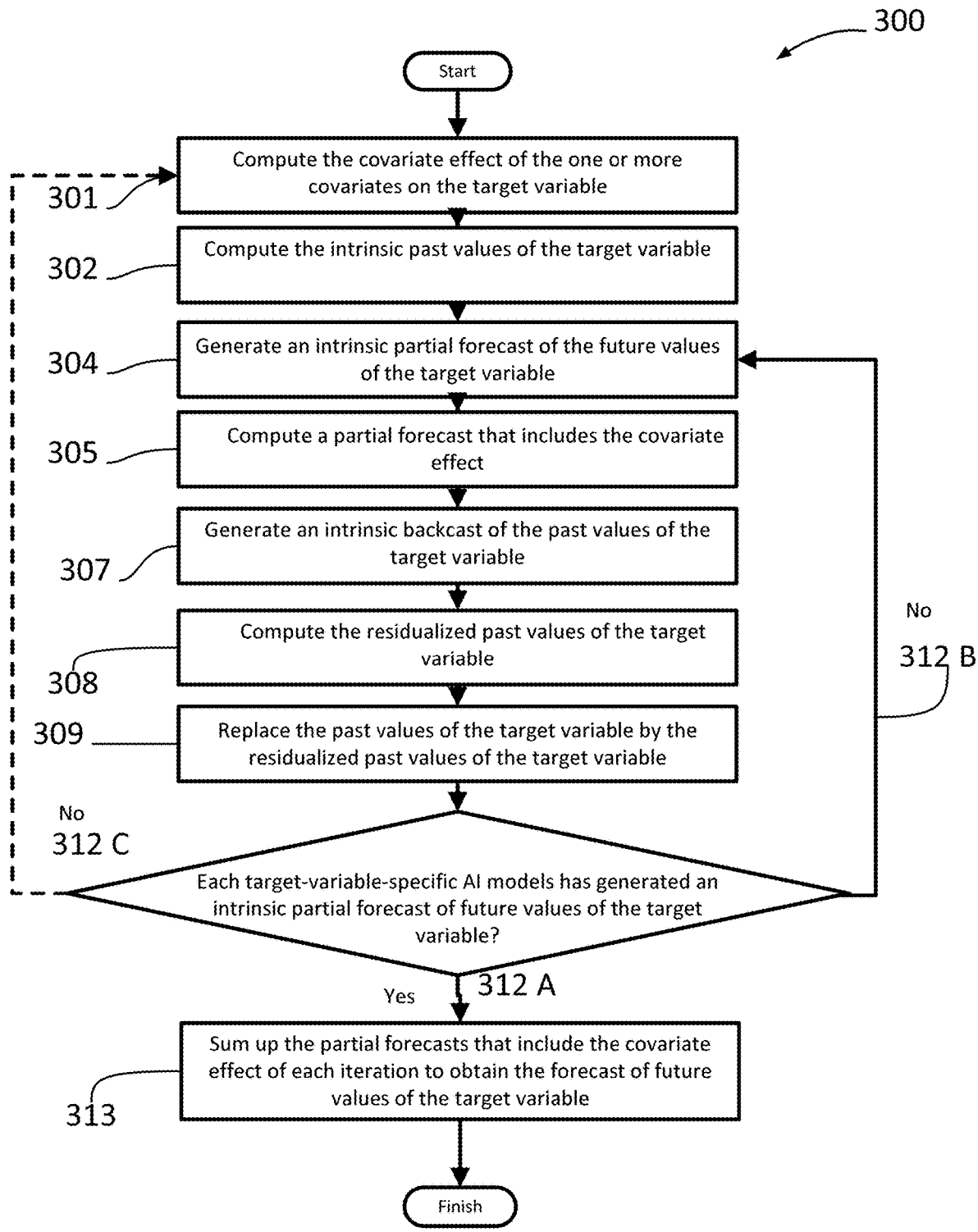
FIG. 3 is a flow chart of an exemplary method for forecasting a target variable in accordance with the teachings of a first set of embodiments of the present invention.
Figure 7:
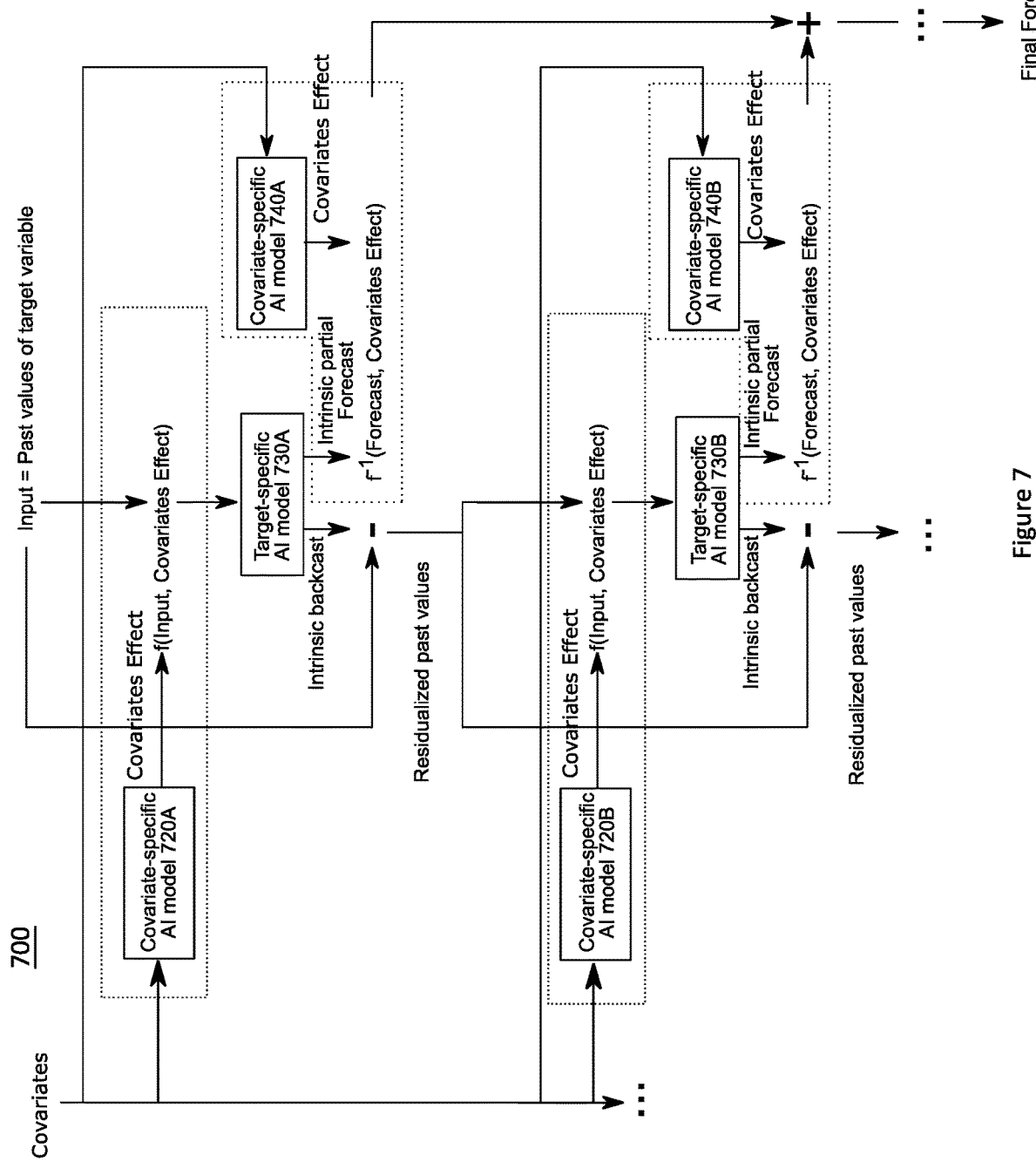
FIG. 7 is a schematic view of an exemplary architecture for forecasting a target variable in accordance with the teachings of a first set of embodiments of the present invention.

Reference is now concurrently made to the drawings in which FIG. 3 and FIG. 7 show a flow chart of an exemplary method 300 and a schematic view of an architecture 700 for forecasting future values of a target variable using past values thereof. In the method 300 the values of the target variable are affected by one or more covariates. The covariates are independent from the target variable. The method 300 combines a plurality of target-variable-specific AI models (730A & 730B) and covariate-specific AI models (720A, 720B, 740A & 740B) to forecast the future values of the target variable.

As explained above, the past and future values of the target variable are known as the time series of the target variable. The target variable is the variable whose future values are to be forecast based on its past values. For instance, the target variable may represent sales of a particular store or a particular product. In such an example, the past values of the target variable may be the sales of this particular store or product during a certain period of time. The sales may be recorded hourly, on a daily, weekly, or monthly basis, etc. The sales of the particular store or product in the time represent the time series of the target variable.

In general, the target variable and the covariates may be closely related. In the example where the target variable were sales for a particular store or product, the covariates may include one or more of: the price, the day of week, the day of month, state where the store is located, special events, etc. An example of a special event may be super Tuesday. The present invention may also be performed for examples where the relationship between the target variable and the covariates is more implicit.

The method 300 comprises, using a covariate-specific AI model 720A, computing 301 the covariates effect of the one or more covariates on the target variable. The covariates affect the target variable. The covariates effect is a defined modification to the values of the target variable caused by the one or more covariates. Generally, the covariate effect refers to the measurable modification that the values of the target variable undergo due to the covariates. For example, one covariate may multiply certain components of the target variable by some coefficient. Thus, in this example, the covariate effect is the multiplication of certain components of the target variable by this same coefficient. Another covariate effect may be the addition of some value to the target variable, etc. The covariate effect may be obtained using a fully connected layer. Alternatively, the covariate effect may be obtained using a convolution block (or convolutional layers).

The covariate-specific AI model 720A is an AI model that has been pre-trained to model the covariates effect on the target variable. Generally, the covariates vary depending on the target variable. Therefore, the covariate-specific AI model 720A may perform better if it is trained on a dataset that is from the same domain as the target variable.

The method 300 also comprises computing 302 intrinsic past values of the target variable by removing the covariate effect of the one or more covariates from past values of the target variable. Removing the covariate effect refers to eliminating the covariates effect from past values of the target variable. By way of illustration, the target variable may be modified as a function of the covariate effect. Removing the covariate effect can be achieved by performing the inverse function. In the example where the one or more covariates multiply certain components of the target variable by some coefficient, removing the covariate effect is performed by dividing these components of the target variable by that same coefficient. In the example where the one or more covariates add some value to the target variable, removing the covariate effect is performed by subtracting this same value from the target variable.

For the sake of clarity, the examples of covariates effects discussed until here are multiplication and addition. More complicated covariates effects may be treated by the present invention. This can be achieved by defining a function that models such covariates effect.

The method 300 comprises generating 304 an intrinsic partial forecast of the future values of the target variable using a target-variable-specific AI model 730A. The target-variable-specific AI model 730A is an AI model that has been pre-trained to output forecasts and backcasts of a target variable when the input is past values of said target variable. For example, a target-variable-specific AI model 730A may be trained to find the seasonal patterns in the target variable. This target-variable-specific AI model 730A may use the seasonal pattern to predict and generate the intrinsic forecast of future values of the target variable.

The method 300 comprises generating 307 an intrinsic backcast of the past values of the target variable using the target-variable-specific AI model 730A. The intrinsic backcast represents past values of the target variable obtained using the intrinsic partial forecast future values of the target variable. The target-variable-specific AI model 730A is an AI model that has been pre-trained to output forecasts and backcasts of a target variable when the input is past values of said target variable.

The method 300 further comprises computing 305 a partial forecast that includes the covariate effect using the partial intrinsic forecast of the future values of the target variable and the covariate effect of the one or more covariates. This is achieved by applying the covariate effect to the forecast of the future values of the target variable. In the example where the covariates multiply certain components of the target variable by some coefficient, including the covariate effect is performed by multiplying the corresponding components of the intrinsic forecast by that same coefficient. In the example where the covariate adds some value to the target variable, including the covariate effect is performed by adding this same value to the intrinsic forecast of the target variable.

The method 300 also comprises computing 308 residualized past values of the target variable. This is performed by subtracting the intrinsic backcast of the past values of the target variable from the past values of the target variable. The method 300 further comprises replacing 309 the past values of the target variable by the residualized past values of the target variable. This is performed in order to residualize the input of each iteration of the method 300. In other words, the backcast of a target-variable-specific AI model 730A will be removed so that it is not used by subsequent target-variable-specific AI models 730B to forecast future values of the target variable. In this way, the method 300 ensures that each feature in the past values of the target variable is used by only one target-variable-specific AI model (730A or 730B, etc.) to generate the intrinsic partial forecast of the target variable.

The steps of the method 300 are performed 312A until each target-variable-specific AI model (730A or 730B, etc.) has generated an intrinsic partial forecast of future values of the target variable. Thereafter, the partial forecasts that include the covariate effect computed at each iteration of the method 300 are summed up 313 to compute the final forecast of future values of the target variable.

If at least one target-variable-specific AI model (730A or 730B, etc.) has not generated an intrinsic partial forecast of future values of the target variable, the method 300 may go back 312C to computing 301 the covariate effect of the one or more covariates on the target variable.

Alternatively, if at least one target-variable-specific AI model (730A or 730B, etc.) has not generated an intrinsic partial forecast of future values of the target variable, the method 300 may go back 312B to generating 304 an intrinsic partial forecast of the future values of the target variable.

The residualized past values of the target variable are computed by subtracting the intrinsic backcast of the past values of the target variable from the past values of the target variable. Therefore, the residualized past values of the target variable computed at the first iteration of the method 300 include the covariates effect. Therefore, the second iteration of the method 300 may be set to begin with computing 301 the covariates effect of the one or more covariates on the target variable.

Optionally, at each iteration of the method 300 a different target-variable-specific AI model (730A or 730B, etc.) may be used to generate the partial forecast of the future values of the target variable. By way of example, in the case where the target-variable-specific AI models are interpretable models, a first target-variable-specific AI model (730A or 730B, etc.) can recognize seasonal patterns and generate the partial intrinsic forecast based on the recognized seasonal pattern. Additionally, a second target-variable-specific AI model (730A or 730B, etc.) can recognize trends and generate the partial intrinsic forecast based on the recognized trend. An interpretable model in this context is an AI model that backcasts and forecasts the coefficients for basis functions (i.e. sinusoids for seasonalities and polynomials for trends). In this case, the AI model is interpretable in the sense that seasonalities and trends are mathematically-defined. More complicated features present in the past values of the target variable may be recognized by the target-variable-specific AI models (730A and 730B, etc.) and used to generate the partial intrinsic forecast of the target-variable-specific AI models (730A and 730B, etc.). For instance, the trend and seasonal patterns could interact with each other in a multiplicative way which would result in larger seasonalities for higher trend levels.

Reference is now made to the drawings in which FIGS. 4A, 4B, 4C, and 4D, referred to as FIG. 4 hereinafter, show an example of the method 300 for forecasting future values of a target variable using past values thereof. In the method 300 the values of the target variable are affected by one or more covariates. The covariates are independent from the target variable. The method 300 combines a plurality of target-variable-specific AI models and covariate-specific AI models to forecast the future values of the target variable.

Figure 4A:
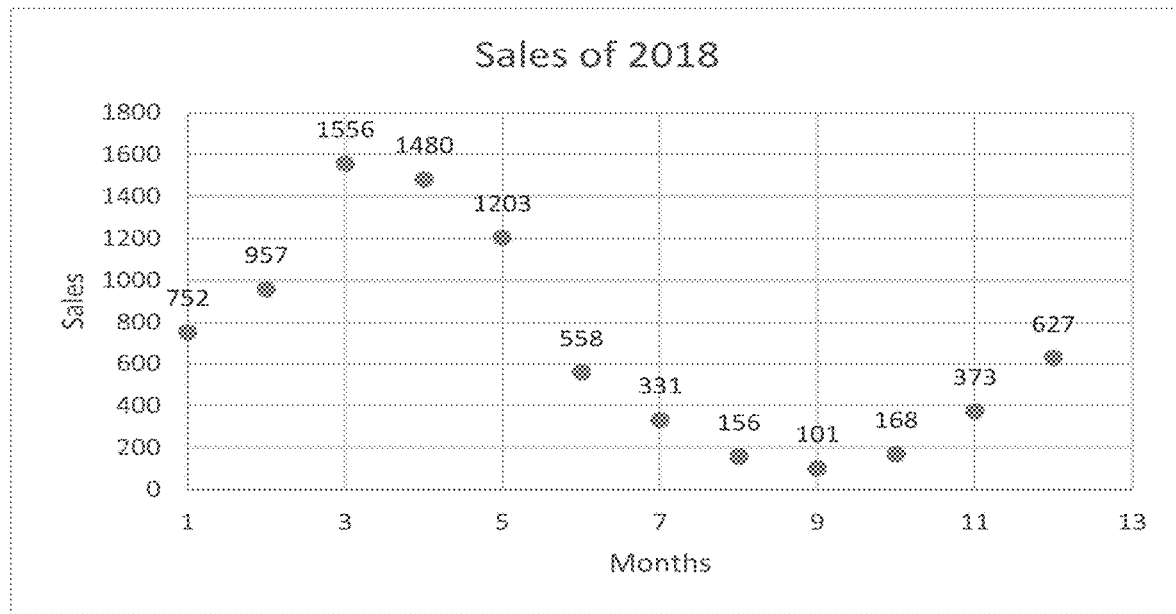
FIGS. 4A, 4B, 4C, and 4D herein referred to concurrently as FIG. 4 represent an example of implementation of the method for forecasting a target variable in accordance with the teachings of a first set of embodiments of the present invention.

The illustrated example relates to monthly sales of a particular product in a particular store for the year 2018 as shown in FIG. 4A. In this example, the aim is to forecast the future value of the sales of that particular product in that particular store for January 2019 (referred to in the figures as the 13th month). In this example, the discount on the price of the product is the only covariate that is considered. In this example, two target-variable-specific AI models (730A and 730B, etc.) are combined with one covariate-specific AI model 720A to forecast the future values of the target variable.

Figure 4B:
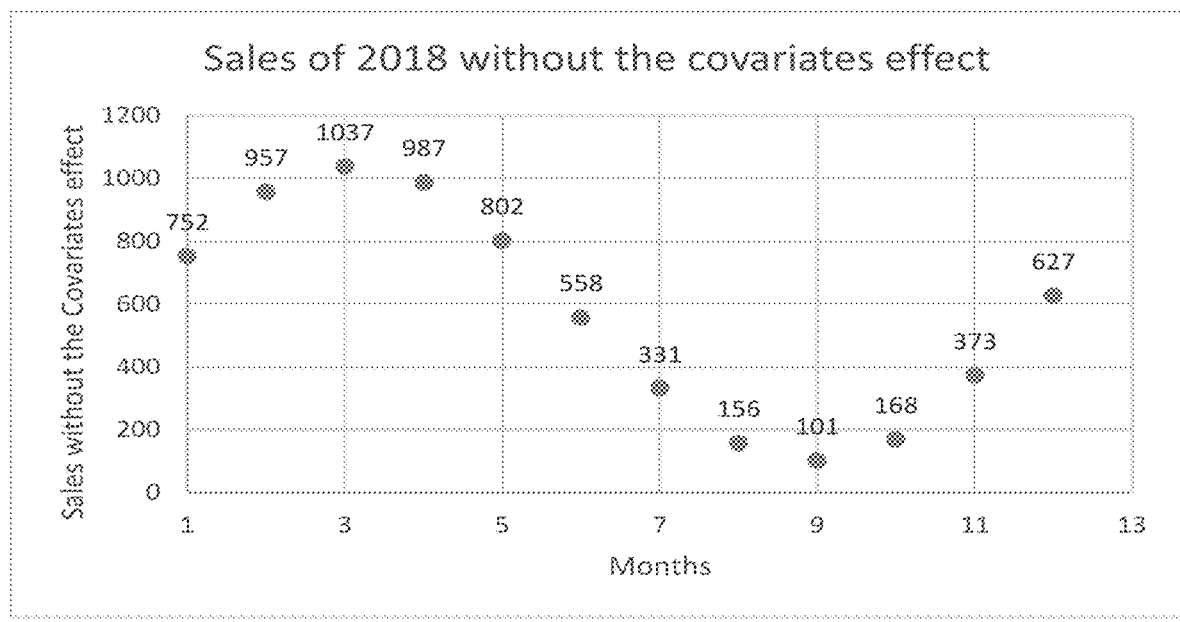

According to the method 300, the covariates effect of the one or more covariates on the target variable have been computed 301 and removed from past values of the target variable (i.e., monthly sales of the particular product in the particular store for the year 2018). In this example, the covariate (i.e., discount on the price of the product) was present in the $3^{rd}$, $4^{th}$, and $5^{th}$ month. The discount resulted in multiplication of the past values of the target variable for the $3^{rd}$, $4^{th}$, and $5^{th}$ months of 2018 by an amount of approximately 1.5. Removing the covariate effect from past values of the target variable is performed by dividing the past values of the target variable for the $3^{rd}$, $4^{th}$, and $5^{th}$ months of 2018 (i.e., monthly sales of the particular product in the particular store) by the same amount of approximately 1.5. FIG. 4B shows the intrinsic past values of the target variable 302 (i.e., monthly sales of the particular product in the particular store for the year 2018 from which the discount effect has been removed).

For ease of explanation, the target-variable-specific AI models that have been considered in the present example are interpretable models.

A first target-variable-specific AI model 730A has detected a seasonal pattern in the intrinsic past values of the target variable. Based on this seasonal pattern, the first target-variable-specific AI model 730A has generated 304 an intrinsic partial forecast of the target variable for the $13^{th}$ month (i.e. 250$). The first target-variable-specific AI model 730A has also generated 307 an intrinsic backcast of the past values of the target variable. In this simple example, the seasonal pattern is also used as the backcast of the past values of the target variable. In more realistic implementations, the target-variable-specific AI models (730A & 730B) use their intrinsic partial forecast to generate the backcast of the past values of the target variable.

Figure 4C:
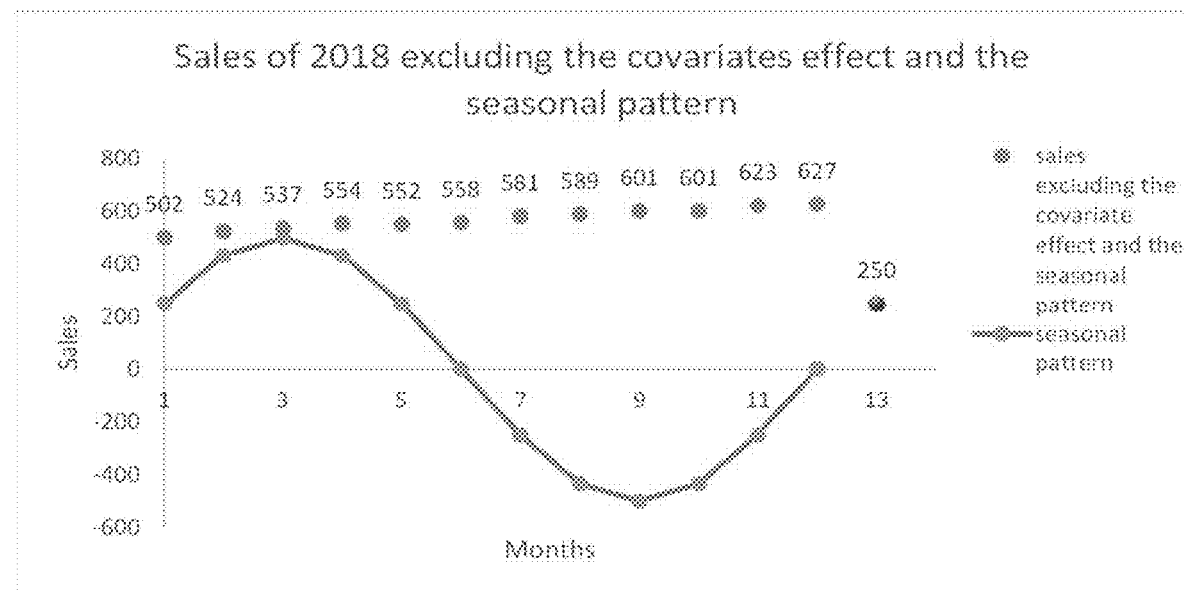

In this example, the covariate (i.e., discount on the price of the product) affects only the values of the target variable (i.e., sales) of the $3^{rd}4^{th}$ and $5^{th}$ months of the year. Therefore, the intrinsic partial forecast of the target variable for the $13^{th}$ month is equal to the partial forecast for the $13^{th}$ month that includes the covariate effect. FIG. 4C shows the detected seasonal pattern and the intrinsic partial forecast of the target variable for the $13^{th}$ month (i.e. 250$) generated by the first target-variable-specific AI model 730A.

Next, the residualized past values of the target variable have been computed 308 by subtracting the intrinsic backcast of the past values of the target variable from the past values of the target variable.

The covariates effect has been removed 302 from the residualized past values of the target variable resulting in the intrinsic past values of the next iteration of the method 300. FIG. 4C also shows the intrinsic past values of the second iteration of the method 300 (i.e., sales excluding the covariate effect and the seasonal pattern).

Although it is not shown, the past values of the target variable have been replaced 309 by the residualized past values of the target variable.

The second iteration of the method 300 continues to detect a trend in the intrinsic past values of the target variable using a second target-variable-specific AI model 730B. The second target-variable-specific AI model 730B has generated 304 an intrinsic partial forecast of the target variable for the $13^{th}$ month (i.e. 647$). The second target-variable-specific AI model 730B has also generated 307 an intrinsic backcast of the past values of the target variable. In this simple example, the trend is also used as the backcast of the past values of the target variable. In more realistic implementations, the target-variable-specific AI models (730A & 730B) use their intrinsic partial forecast to generate the backcast of the past values of the target variable.

Figure 4D:
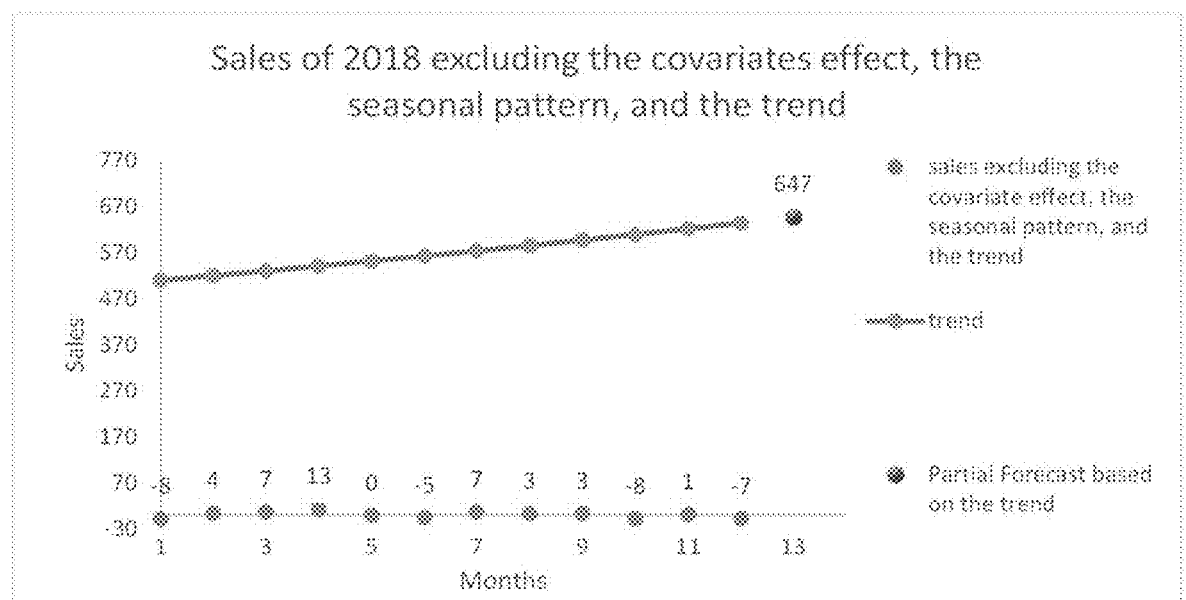

In this example, the covariate (i.e., discount on the price of the product) affects only the values of the target variable (i.e., sales) of the $3^{rd}$, $4^{th}$, and $5^{th}$ months of the year. Therefore, the intrinsic partial forecast of the target variable for the $13^{th}$ month is equal to the partial forecast for the $13^{th}$ month that includes the covariate effect. FIG. 4D shows the detected trend and the intrinsic partial forecast of the target variable for the $13^{th}$ month (i.e. 647$) generated by the second target-variable-specific AI model 730B.

The residualized past values of the target variable have been computed 308 by subtracting the intrinsic backcast of the past values of the target variable from the past values of the target variable.

FIG. 4D also shows the intrinsic past values after the second iteration of the method 300 (i.e., sales excluding the covariate effect, the seasonal pattern and the trend). In this example, the intrinsic past values after the second iteration of the method 300 are modeled by a normal distribution with a zero mean and a variance equal to 10. The intrinsic past values after the second iteration of the method 300 are therefore considered as white noise and are not further used to generate more intrinsic partial forecasts.

In accordance with the method 300, each one of the one or more target-variable-specific AI model (730A & 730B) has generated an intrinsic partial forecast of the future values of the target variable.

The partial forecasts that include the covariate effect are summed up to compute the final forecast of the target variable. In this case, the forecast for the sales for the $13^{th}$ month (i.e., January 2019) is: 250+647=897$. To be more complete, some white noise modeled by a normal distribution with a zero mean and a variance equal to 10 may be added to the forecast final forecast for the sales for the $13^{th}$ month.

In accordance with the second set of embodiments of the present invention, a forecast is produced by combining time series forecasting with temporal and categorical covariates. This is achieved by combining a temporal-covariate-specific AI model 810A that forecasts the temporal covariates in the horizon with a target-variable-specific AI model 830A that performs well for forecasting tasks and a covariate-specific AI model 820A that performs well for defining the covariates effect on the target variable. The time period during which the target variable is to be forecast is known as the horizon. Once the temporal and the categorical covariate's effect are defined, they are removed from the target variable before forecasting. In some embodiments, one or more covariate-specific AI models (820A & 820B) can be combined with a plurality of target-variable-specific AI models (830A & 830B) and a plurality of temporal-covariate-specific AI models (810A & 810B) to produce the forecast.

A categorical covariate is a covariate that belongs to a discrete category. In other words, the categorical covariate can take one of a limited and generally fixed number of values. An example of a categorical covariate is the discount on sales discussed with reference to FIG. 4.

A temporal covariate is a covariate that fluctuates in time. Some temporal covariates may have an unknown horizon, which means that their future values are unknown and therefore have to be forecast. Other temporal covariates may be known in the horizon.

Figure 5:
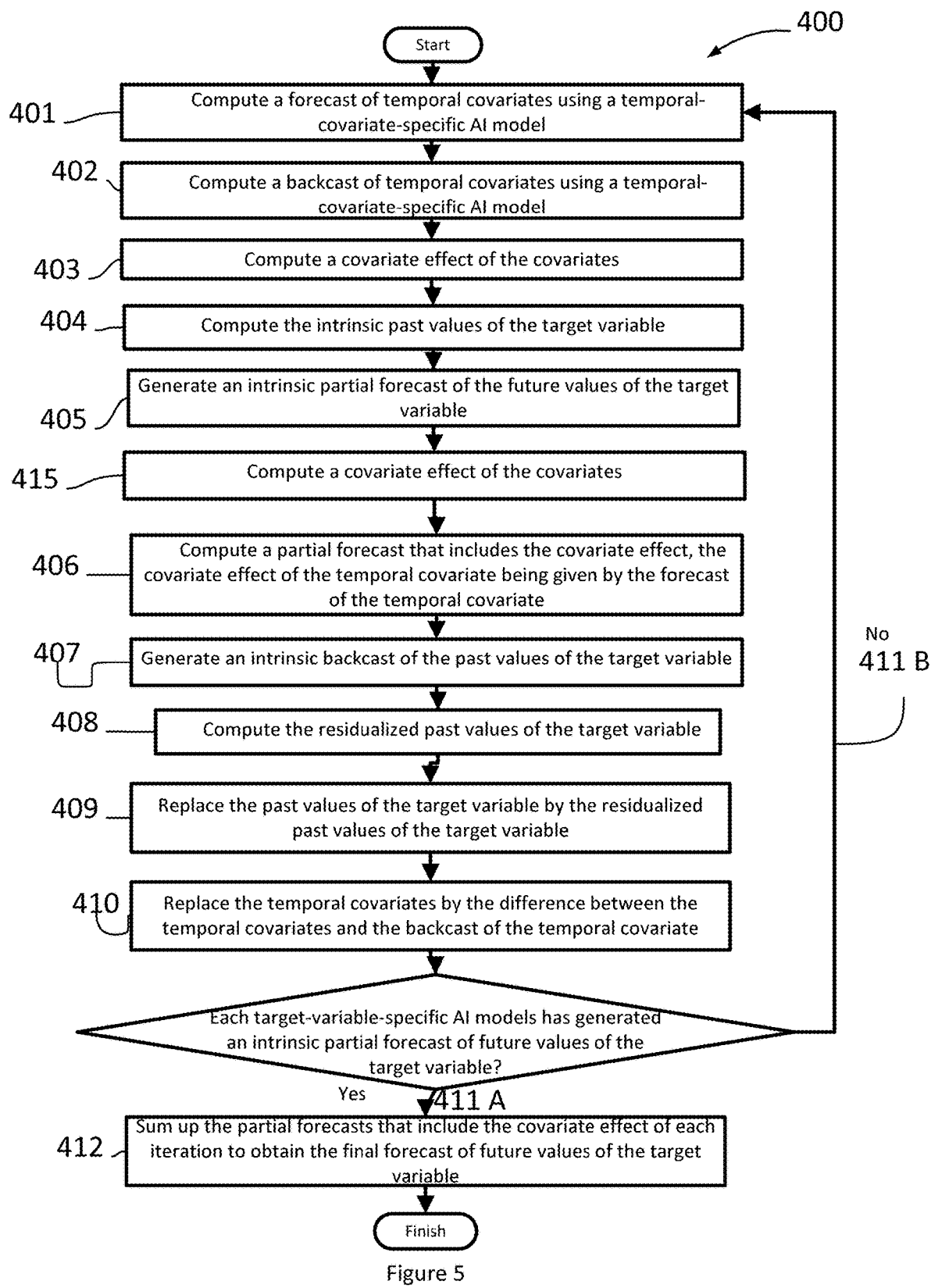
FIG. 5 is a flow chart of an exemplary method for forecasting a target variable in accordance with the teachings of a second set of embodiments of the present invention.
Figure 6:
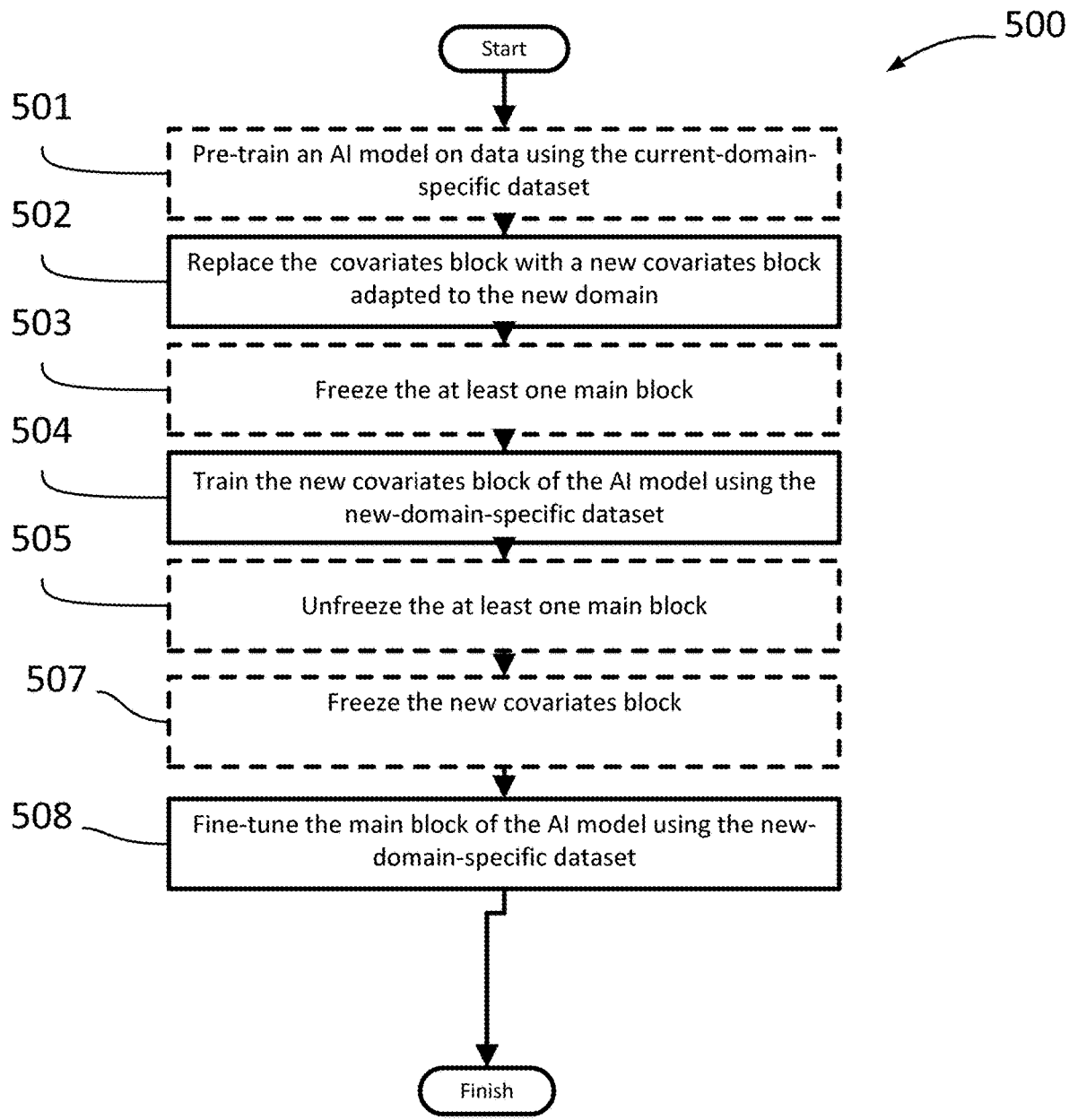
FIG. 6 is a flow chart of an exemplary method for adapting an AI model to a new domain in accordance with the teachings of a third set of embodiments of the present invention.
Figure 8:
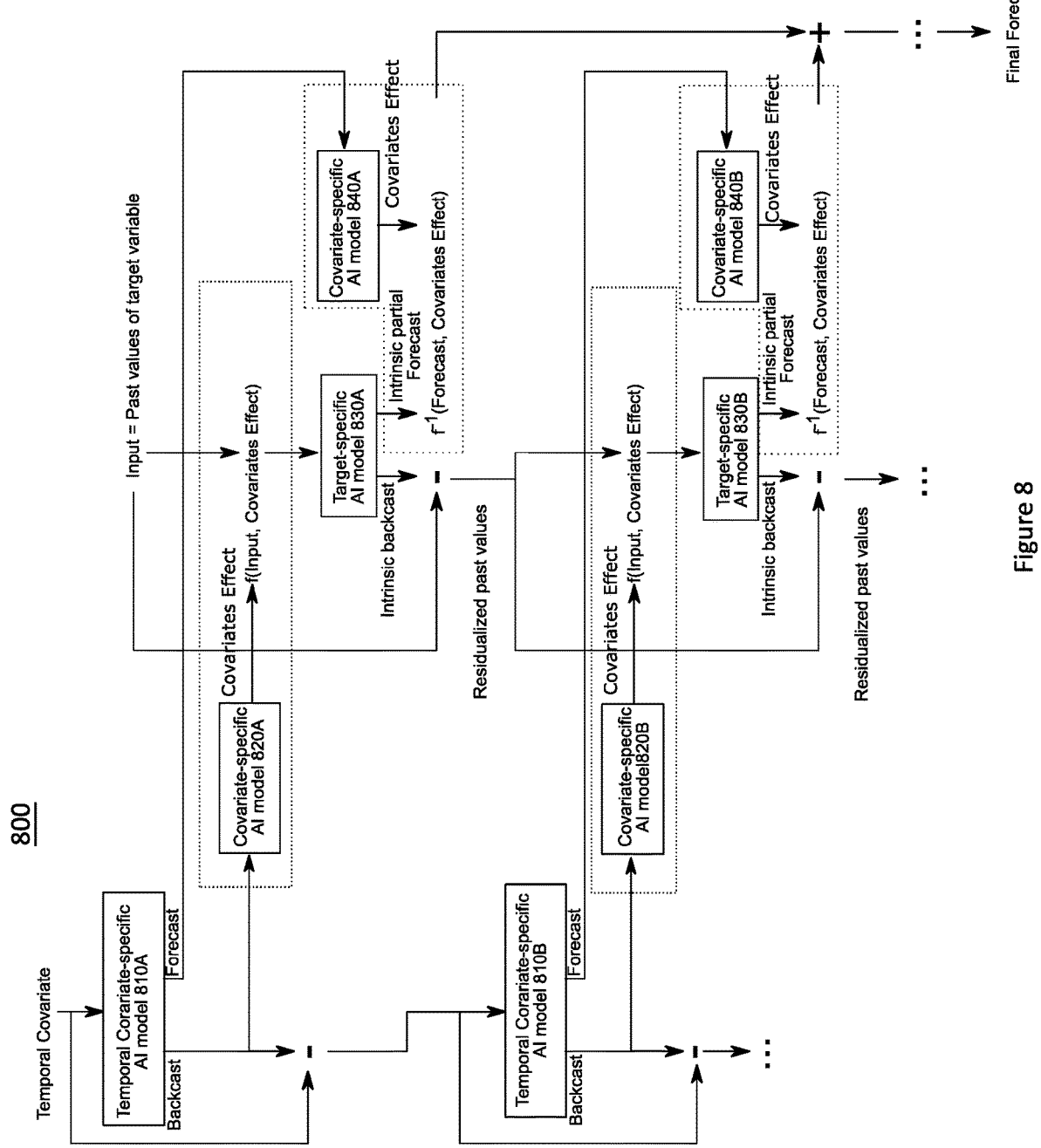
FIG. 8 is a schematic view of an exemplary architecture for forecasting a target variable in accordance with the teachings of a second set of embodiments of the present invention.

FIG. 5 and FIG. 8 show a method 400 and an exemplary view of an architecture 800 for forecasting future values of a target variable based on past values thereof.

The method 400 comprises, using a temporal-covariate-specific AI model 810A, computing 401 a forecast of future values of the temporal covariates that are unknown in the horizon. The temporal-covariate-specific AI model 810A is an AI model that has been pre-trained to output forecasts and backcasts of a temporal covariate when the input is past values of said temporal covariate. For example, a temporal-covariate-specific AI model 810A may be trained to detect the seasonal patterns in the temporal covariate. This temporal-covariate-specific AI model 810A may use the seasonal pattern to predict and generate the intrinsic forecast of future values of the temporal covariate.

The method 400 comprises, using a temporal-covariate-specific AI model 810A, computing 402 a backcast of the past values of the temporal covariates. The backcast of the past values of the temporal covariates represents past values of the temporal covariates obtained using the forecast future values of the temporal covariate. The temporal-covariate-specific AI model 810A is an AI model that has been pre-trained to output forecasts and backcasts of a temporal covariate when the input is past values of said temporal covariate.

The method 400 comprises, using a covariate-specific AI model 820A, computing 403 the covariates effect of the one or more covariates on the past values of the target variable. The covariates effect is a defined modification to the past values of the target variable caused by the one or more covariates. At this step, the covariate effect combines the effect of the temporal and the categorical covariates on the target variable. The temporal covariate effect refers to the covariate effect of both temporal covariates that are known and unknown in the horizon. The temporal covariate effect of the covariates that have unknown values in the horizon is computed as a function of the backcast of the temporal covariates.

The covariate-specific AI model 820A is an AI model that has been pre-trained to model the covariates effect on the target variable. Generally, the covariates vary depending on the target variable. Therefore, the covariate-specific AI model 820A may perform better if it is trained on a dataset that is from the same domain as the target variable.

The method 400 also comprises computing 404 intrinsic past values of the target variable by removing the covariate effect of the covariates from past values of the target variable. Removing the covariate effect refers to eliminating the covariates effect from past values of the target variable. By way of illustration, the target variable may be modified as a function of the covariate effect. Removing the covariate effect can be achieved by performing the inverse function. In the example where the covariates multiply certain components of the target variable by some coefficient, removing the covariate effect is performed by dividing these components of the target variable by that same coefficient. In the example where the covariates add some value to the target variable, removing the covariate effect is performed by subtracting this same value from the target variable.

The method 400 comprises generating 305 an intrinsic partial forecast of the future values of the target variable using a target-variable-specific AI model 830A. The target-variable-specific AI model 830A is an AI model that has been pre-trained to output forecasts and backcasts of a target variable when the input is past values of said target variable. For example, a target-variable-specific AI model 830A may be trained to find the seasonal patterns in the target variable. This target-variable-specific AI model 830A may use the seasonal pattern to predict and generate the intrinsic forecast of future values of the target variable.

The method 400 comprises, using a covariate-specific AI model 840A, computing 415 the covariates effect of the one or more covariates on the future values of the target variable. The covariates effect is a defined modification to the future values of the target variable caused by the one or more covariates. At this step, the covariate effect combines the effect of the temporal and the categorical covariates on the target variable. The temporal covariate effect is computed as a function of the forecast of the temporal covariates.

The covariate-specific AI model 840A is an AI model that has been pre-trained to model the covariates effect on the target variable. Generally, the covariates vary depending on the target variable. Therefore, the covariate-specific AI model 840A may perform better if it is trained on a dataset that is from the same domain as the target variable.

The method 400 further comprises computing 406 a partial forecast that includes the covariate effect using the partial intrinsic forecast of the future values of the target variable and the covariate effect of the covariates on the future values of the target variable. This is achieved by applying the covariate effect of the covariates on the future values of the target variable to the forecast of the future values of the target variable. In the example where the covariates multiply certain components of the target variable by some coefficient, including the covariate effect is performed by multiplying the corresponding components of the intrinsic forecast by that same coefficient. In the example where the covariate adds some value to the target variable, including the covariate effect is performed by adding this same value to the intrinsic forecast of the target variable.

The method 400 comprises generating 407 an intrinsic backcast of the past values of the target variable using the target-variable-specific AI model 830A. The intrinsic backcast represents past values of the target variable obtained using the intrinsic partial forecast future values of the target variable. The target-variable-specific AI model 830A is an AI model that has been pre-trained to output forecasts and backcasts of a target variable when the input is past values of said target variable.

The method 400 also comprises computing 408 residualized past values of the target variable. This is performed by subtracting the intrinsic backcast of the past values of the target variable from the past values of the target variable. The method 400 further comprises replacing 409 the past values of the target variable by the residualized past values of the target variable. This is performed in order to residualize the input of each iteration of the method 400. In other words, the backcast of a target-variable-specific AI model (830A or 830B, etc.) will be removed so that it is not used by subsequent target-variable-specific AI models (830A or 830B, etc.) to forecast future values of the target variable. In this way, the method 300 ensures that each feature in the past values of the target variable is used by only one target-variable-specific AI model (830A or 830B, etc.) to generate the intrinsic partial forecast of the target variable.

The method 400 further also comprises replacing 410 the past values of the temporal covariates by the residualized past values of the temporal covariates. This is performed in order to residualize the input of each temporal-covariate-specific AI model (810A & 810B, etc.) at each iteration of the method 400. In other words, the backcast of each temporal-covariate-specific AI model (810A & 810B, etc.) will be removed so that it is not used by subsequent temporal-covariate-specific AI models (810A & 810B, etc.) to forecast future values of the temporal covariate. In this way, the method 400 ensures that each feature in the temporal covariate is used by only one temporal-covariate-specific AI model (810A or 810B, etc.) to generate the forecast of the future values of the temporal covariate.

The steps of the method 400 are performed 411A until each target-variable-specific AI model (830A & 830B, etc.) has generated an intrinsic partial forecast of future values of the target variable. Thereafter, the partial forecasts that includes the covariate effect computed at each iteration of the method 400 are summed up 412 to compute the final forecast of future values of the target variable.

If at least one target-variable-specific AI model (830A or 830B, etc.) has not generated an intrinsic partial forecast of future values of the target variable, the method 400 goes back 412B to computing 401 the forecast of the temporal covariates using a temporal-covariate-specific AI model (810A or 810B, etc.).

If at least one temporal-covariate-specific AI model (810A & 810B, etc.) has not generated a forecast of future values of the temporal covariate, the method 400 goes back 412B to computing 401 the forecast of the temporal covariates using a temporal-covariate-specific AI model (810A or 810B, etc.).

Optionally, at each iteration of the method 400 a different target-variable-specific AI models (830A & 830B, etc.) may be used to generate the partial forecast of the future values of the target variable. By way of example, in the case where the target-variable-specific AI models (830A & 830B, etc.) are interpretable models, a first target-variable-specific AI model (830A or 830B, etc.) can recognize seasonal patterns and generate the partial intrinsic forecast based on the recognized seasonal pattern. Additionally, a second target-variable-specific AI model (830A or 830B, etc.) can recognize trends and generate the partial intrinsic forecast based on the recognized trend. More complicated features present in the past values of the target variable may be recognized by the target-variable-specific AI models (830A & 830B, etc.) and used to generate the partial intrinsic forecast of the target-variable-specific AI models (830A & 830B, etc.). For instance, the trend and seasonal patterns could interact with each other in a multiplicative way which would result in larger seasonalities for higher trend levels.

Optionally, at each iteration of the method 400 a different temporal-covariate-specific AI model (810A & 810B, etc.) may be used to generate the forecast of the future values of the temporal covariate.

The method 400 as described above takes into account a plurality of target-variable-specific AI models (830A & 830B, etc.), temporal-covariate-specific AI models (810A & 810B, etc.), and covariate-specific AI models (820A, 820B, 840A, & 840B, etc.). Based on the method 200 and 300, a person skilled in the art would be able to adapt the teachings of the method 400 to examples where only one of each one of the target-variable-specific AI models, temporal-covariate-specific AI models, and covariate-specific AI models is needed.

In accordance with a third set of embodiments of the present invention, a method for adapting to a new domain an AI model pre-trained for a current domain is disclosed. The AI model has at least one main block for modeling a target variable and at least one covariates block for modeling covariates effect on the target variable in the current domain. The values of the target variable are considered to be affected by one or more covariates wherein the covariates are independent from the target variable. The at least one covariates block computes the covariates effect on the target variable and the at least one main block generates the forecast of future values of the target variable based on past values thereof. The at least one main block may also generate a backcast of past values of the target variable.

The at least one main block and the at least one covariates block are similar to the target-variable-specific AI model and the covariate-specific AI model discussed with respect to the first and second set of embodiments. The AI model generates a forecast of future values of a target variable using past values of the target variable by combining the covariate block with the main block. The covariate block computes the covariate effect on the target variable and the main block generates the forecast of future values of the target variable. The covariate effect on the target variable is removed before forecasting its future values. The AI model generates the forecast of future values of the target variable according to the method 300. In cases where the AI model comprises a plurality of main blocks and a plurality of covariate blocks, the AI model generates the forecast of future values of the target variable according to the method 400.

According to the method 500, adapting the AI model to a new domain is performed by replacing the covariates block with a new covariates block adapted to the new domain, training the new covariates block on a new-domain-specific dataset, and fine-tuning the main block of the AI model using the new-domain-specific dataset from the new domain. In some embodiments, the AI model may have more than one covariates block and/or main block and repetition can be made for more than one block of the AI model.

The method 500 may start with, using a processor module, pre-training 501 the AI-model to forecast future values of the target variable using past values thereof. The AI model is the result of applying learning algorithms on the training dataset (i.e., a subset of the current-domain-specific dataset). In the example, the AI-model is pre-trained using the current-domain-specific dataset. The current-domain-specific dataset refers to the dataset related to the target variable in the current domain. During the AI model pre-training process, the AI model is provided with past values of the target variable and covariates time series. From this information, the AI model computes the parameters that fit best the training dataset. The parameters include weights that may be seen as the strength of the connection between two variables (e.g. two neurons of two subsequent layers). The parameters may also include a bias parameter that measures the expected deviation from the future values of the target variable. The learning process refers to finding the optimal parameters that fit the training dataset. This is done typically by minimizing the training error defined as the distance between the forecast future values of the target variable computed by the AI model and the future values of the target variable. The goal of the pre-training process is to find values of parameters that make the forecast of the AI model optimal. A part of the pre-training process is testing the AI model on a new subset of the current-domain-specific dataset. Here, the AI model is provided with a new subset of the current-domain-specific dataset for which a forecast of future values of the target variable is to be computed. The ability of the AI model to produce a correct forecast for a new subset of the current-domain-specific dataset is called generalization. The performance of the AI model is improved by diminishing the generalization error defined as the expected value of the forecast error on a new subset of the current-domain-specific dataset.

Alternatively, if the AI model is already pre-trained to forecast future values of the target variable using past values thereof in the current domain, the method may start directly by, using a processor module, replacing 502 the covariates block with a new covariates block adapted to the new domain. The new covariates block is similar to the covariate block except that one or more first layers are changed in the new covariates block. The target variable in the new domain may be affected differently by at least one of the one or more covariates. The new covariate block can structurally accommodate the covariates in the new domain.

As known in the art, the inputs of an AI model feed into a layer of hidden units, which can feed into layers of more hidden units, which eventually feed into the output layer of the AI model. Each of the hidden units may be a squashed linear function of its inputs. The layers contain the knowledge "learned" during training and store this knowledge in the form of weights. The layers are responsible for finding small features, that eventually lead to the forecast.

Changing the one or more first layers may be performed by changing the weights of the hidden units of these layers. Changing the one or more first layers may also be performed by changing the number of hidden units of each layer of the one or more layers. Generally, the one or more first layers may be replaced to accommodate the covariates of the new domain. For instance, the input size of the input layer will need to match the number of the covariates of the new domain and the output size of the new layers must match the output size of the replaced layers.

The target variable is affected by one or more covariates. As previously explained, the target variable can be seen as a variable that depends on a plurality of variables. The covariates refer to the covariate time series that influence the target variable but are independent therefrom.

Depending on the current domain and the new domain, the target variable may be affected differently by at least one of the one or more covariates. The target variable may also be affected by at least one different covariate in the new domain. For example, an AI model could be pre-trained to forecast sales using a current-domain-dataset from a first retailer located in the United States, with US-specific holidays as one of the covariates. If the model were to be applied to a second retailer located in Canada, the covariate related to US-specific holidays will need to be changed in order to be able to adapt the AI model to the new domain as the Canadian holidays are different from those in the United States.

The method 500 comprises, using a processor module, training 504 the new covariates block of the AI model using the new-domain-specific dataset from the new domain. The new domain-specific dataset refers to the values of the target variable in the new domain and the covariates of the new domain. At the end of this step, the covariate block is trained to compute a covariates effect of the one or more covariates on the target variable. The covariates effect is a defined modification to the values of the target variable caused by the one or more covariates. Consequently, the covariate block is trained to compute the measurable modification that the values of the target variable undergo (i.e., covariate effect) due to the covariates.

The method 500 may comprise, using a processor module, freezing 503 the main block before training 504 the new covariates block of the AI model using the new-domain-specific dataset from the new domain. This is performed in order to prevent the main block from learning and therefore changing its weights and bias to fit the new-domain-specific dataset.

The method 500 may comprise, using a processor module, unfreezing 505 the main block after training 504 the new covariates block of the AI model using the new-domain-specific dataset from the new domain. This is performed in order to allow the main block to adapt to the new-domain-specific dataset.

The method 500 further comprises, using a processor module, fine-tuning the main block of the AI model using the new-domain-specific dataset from the new domain. Fine-tuning refers to the process of making small adjustments to the main block so that the main block will be able to forecast future values of the target variable in the new domain.

Generally, fine-tuning the at least one main block of the AI model on data from the new domain may be performed using transfer learning based fine-tuning.

Depending on the similarity between the current and the new domain, fine-tuning the main block may be performed by replacing the last layer of the main block of the pre-trained AI model with a new layer that is more relevant to forecasting future values of the target variable in the new domain.

Fine-tuning the main block may additionally or alternatively be performed by running back propagation on the main block to fine-tune the pre-trained weights of the main block. Fine-tuning the main block may also be performed by using a smaller learning rate to train the main block. Since the pre-trained weights are expected to be already satisfactory in forecasting future values of the target variable as compared to randomly initialized weights, the idea is to not distort them too quickly and too much. A common practice to achieve this is by making the learning rate of the main block of the AI model during fine-tuning ten times smaller than the learning rate used during the pre-training process 501.

Fine-tuning the main block may further by performed by freezing the weights of the first few layers of the pre-trained main block. This is because the first few layers capture universal features that are also relevant to forecasting the future values of the target variable in the new domain. Therefore, the new main block may perform better if those weights are kept intact and learning the new-domain-specific dataset's features is accomplished in the subsequent layers.

Optionally, fine-tuning the main block of the AI model on data from the new domain is performed using incremental moment matching algorithms.

While choosing the strategy to fine-tune the main block, one should consider that fine-tuning the pre-trained main block on a small dataset might lead to overfitting, especially if the last few layers of the main block are fully connected layers.

The method 500 may comprise, using a processor module, freezing 507 the new covariates block before fine-tuning 508 the main block of the AI model using the new-domain-specific dataset from the new domain. In this way, the AI model will focus on fine-tuning the main block.

The main block of the AI model may, optionally, be a neural network based model for univariate time series forecasting (N-BEATS).

It is readily apparent to a person skilled in the art that the method 500 may be applied to AI models having one or more main blocks.

The advantages of the method 500 may be readily apparent for a person skilled in the art. For example, the method 500 may be performed in cases where a large dataset is available for training the AI model in the current domain (i.e., current-domain-specific dataset) and smaller datasets are available in the new domain (i.e., current-domain-specific dataset). As the AI model is to be pre-trained on a large current-domain-specific dataset this will potentially lead to a more robust AI model. Indeed, according to the fundamental theorem of machine learning, the error rate of a machine learning algorithm is inversely proportional to the size of the sample on which the learning algorithm is to be trained. Therefore, the forecasts of future values of the target variable in the new domain will be more accurate due to the method 500.

The present invention is not affected by the way the different modules exchange information between them. For instance, the memory module and the processor module could be connected by a parallel bus, but could also be connected by a serial connection or involve an intermediate module (not shown) without affecting the teachings of the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for adapting an artificial intelligence (AI) model pre-trained for a current domain to a new domain, the method comprising:
providing at least one main block of the AI model for modeling a target variable and at least one covariates block of the AI model for modeling effects of one or more covariates on the target variable in the current domain, the AI model being pre-trained to forecast future values of the target variable using past values thereof in the current domain, the future values of the target variable being affected by the one or more covariates wherein the one or more covariates are independent from the target variable, and in order to adapt the AI model to the new domain:
replacing a covariates block of the at least one covariates block with a new covariates block adapted to the new domain, wherein the covariates block comprises one or more first layers comprising a number of hidden units with respective weights, with the new covariates block modifying the number of the hidden units, the respective weights, or both, of the one or more first layers based on covariates of the new domain, the target variable in the new domain being affected differently by at least one of the one or more covariates;
training the new covariates block of the AI model using a new-domain-specific dataset from the new domain; and
fine-tuning the at least one main block of the AI model using the new-domain-specific dataset from the new domain.

2. The method of claim 1, wherein the at least one main block of the AI model models the target variable by producing a forecast of the future values of the target variable.

3. The method of claim 1, wherein the target variable in the new domain is affected by at least one covariate different from the one or more covariates affecting the target variable in the current domain.

4. The method of claim 1, wherein the new covariates block is chosen to structurally accommodate the covariates of the new domain.

5. The method of claim 1, wherein training the new covariates block of the AI model using the new-domain-specific dataset is performed by:
freezing the at least one main block; and
training the AI model using the new-domain-specific dataset.

6. The method of claim 5, wherein freezing the at least one main block is performed to prevent the at least one main block from fitting the new-domain-specific dataset.

7. The method of claim 1, wherein before fine-tuning the at least one main block of the AI model using the new-domain-specific dataset the method includes:
freezing the covariates block; and
unfreezing the at least one main block.

8. The method of claim 1, wherein the main block is a neural network based model for univariate time series forecasting.

9. The method of claim 1, wherein fine-tuning the at least one main block of the AI model on data from the new domain is performed using incremental moment matching algorithms.

10. The method of claim 1, wherein fine-tuning the at least one main block of the AI model on data from the new domain is performed using transfer learning based fine-tuning.

11. The method of claim 1, further comprising computing a backcast of the past values of the target variable.

12. An artificial intelligence server configured for adapting an artificial intelligence (AI) model pre-trained for a current domain to a new domain, the artificial intelligence server comprising:
a memory module for storing a new-domain-specific dataset and a current-domain-specific dataset;
a processor module that, having at least one main block of the AI model for modeling a target variable and at least one covariates block of the AI model for modeling effects of one or more covariates on the target variable in the current domain, the AI model being pre-trained to forecast future values of the target variable using past values thereof in the current domain, the future values of the target variable being affected by the one or more covariates wherein the one or more covariates are independent from the target variable, and in order to adapt the AI model to the new domain, the processor module is configured to:
replace a covariates block of the at least one covariates block with a new covariates block adapted to the new domain, wherein the covariates block comprises one or more first layers comprising a number of hidden units with respective weights, with the new covariates block modifying the number of the hidden units, the respective weights, or both, of the one or more first layers based on covariates of the new domain, the target variable in the new domain being affected differently by at least one of the one or more covariates;

train the new covariates block of the AI model using a new-domain-specific dataset from the new domain; and fine-tune the at least one main block of the AI model using the new-domain-specific dataset from the new domain.

13. The artificial intelligence server of claim 12, wherein the at least one main block of the AI model models the target variable by producing a forecast of the future values of the target variable.

14. The artificial intelligence server of claim 12, wherein the target variable in the new domain is affected by at least one covariate different from the one or more covariates affecting the target variable in the current domain.

15. The artificial intelligence server of claim 12, wherein the new covariates block is chosen to structurally accommodate the covariates of the new domain.

16. The artificial intelligence server of claim 12, wherein training the new covariates block of the AI model using the new-domain-specific dataset is performed by:

freezing the at least one main block; and training the AI model using the new-domain-specific dataset.

17. The artificial intelligence server of claim 16, wherein freezing the at least one main block is performed to prevent the at least one main block from fitting the new-domain-specific dataset.

18. The artificial intelligence server of claim 12, wherein the processor module is configured to before fine-tuning the at least one main block of the AI model using the new-domain-specific dataset:

freeze the covariates block; and unfreeze the at least one main block.

19. The artificial intelligence server of claim 12, wherein the main block is a neural network based model for univariate time series forecasting.

20. The artificial intelligence server of claim 12, wherein fine-tuning the at least one main block of the AI model on data from the new domain is performed using incremental moment matching algorithms.

21. The artificial intelligence server of claim 12, wherein fine-tuning the at least one main block of the AI model on data from the new domain is performed using transfer learning based fine-tuning.

22. The artificial intelligence server of claim 12, wherein the processor module is further configured to compute a backcast of the past values of the target variable.

* * * * *